D. J. McCLUSKEY.
SPRING WHEEL.
APPLICATION FILED NOV. 24, 1919.

1,399,220.

Patented Dec. 6, 1921.

INVENTOR
Daniel. J. McCluskey.
BY
Carlos P. Griffin
ATTORNEY.

UNITED STATES PATENT OFFICE.

DANIEL J. McCLUSKEY, OF BERKELEY, CALIFORNIA.

SPRING-WHEEL.

1,399,220.  Specification of Letters Patent.  Patented Dec. 6, 1921.

Application filed November 24, 1919. Serial No. 340,121.

*To all whom it may concern:*

Be it known that I, DANIEL J. McCLUSKEY, citizen of the United States, residing at Berkeley, in the county of Alameda, State of California, have invented a new and useful Spring-Wheel, of which the following is a specification in such full and clear terms as will enable those skilled in the art to construct and use the same.

This invention relates to a spring wheel for vehicles, the object of which is to reduce the wear on the tires and the mechanism of a motor vehicle.

An object of the present invention is to produce a spring wheel of such construction as will obtain the longest possible life for the springs, while at the same time giving sufficient resiliency to afford an easy riding mechanism of the necessary strength for the support of the vehicle and its load.

It will be understood by those familiar with the operation of the springs that spring failures are usually caused by the repeated bending in one direction and then another of the spring in question, the break ordinarily occurring when the spring is being stressed in the opposite direction to its normal load. This invention therefore seeks to avoid this condition by producing a spring wheel of such a construction that nearly all the springs will be carrying some of the load at all times, and in which none of the springs can be stressed in reverse directions, thereby eliminating one serious cause of spring breakage, not considering the forces at right angles to the plane of the wheel. This result is attained by reason of the fact that each individual spring is provided with a pivot and fulcrum on one side only, the spring to be free to turn on its pivot without restraint in a direction opposite to the side upon which the fulcrum is placed.

Another object of the invention is to produce a spring for wheels which will be of as simple a form as possible thereby reducing the manufacturing cost.

Other objects of the invention will appear as the description proceeds.

An embodiment of the invention is shown in the accompanying drawing in which the same reference numeral is applied to the same portion throughout, but I am aware that there may be modifications thereof.

Figures 1, 2, 3:
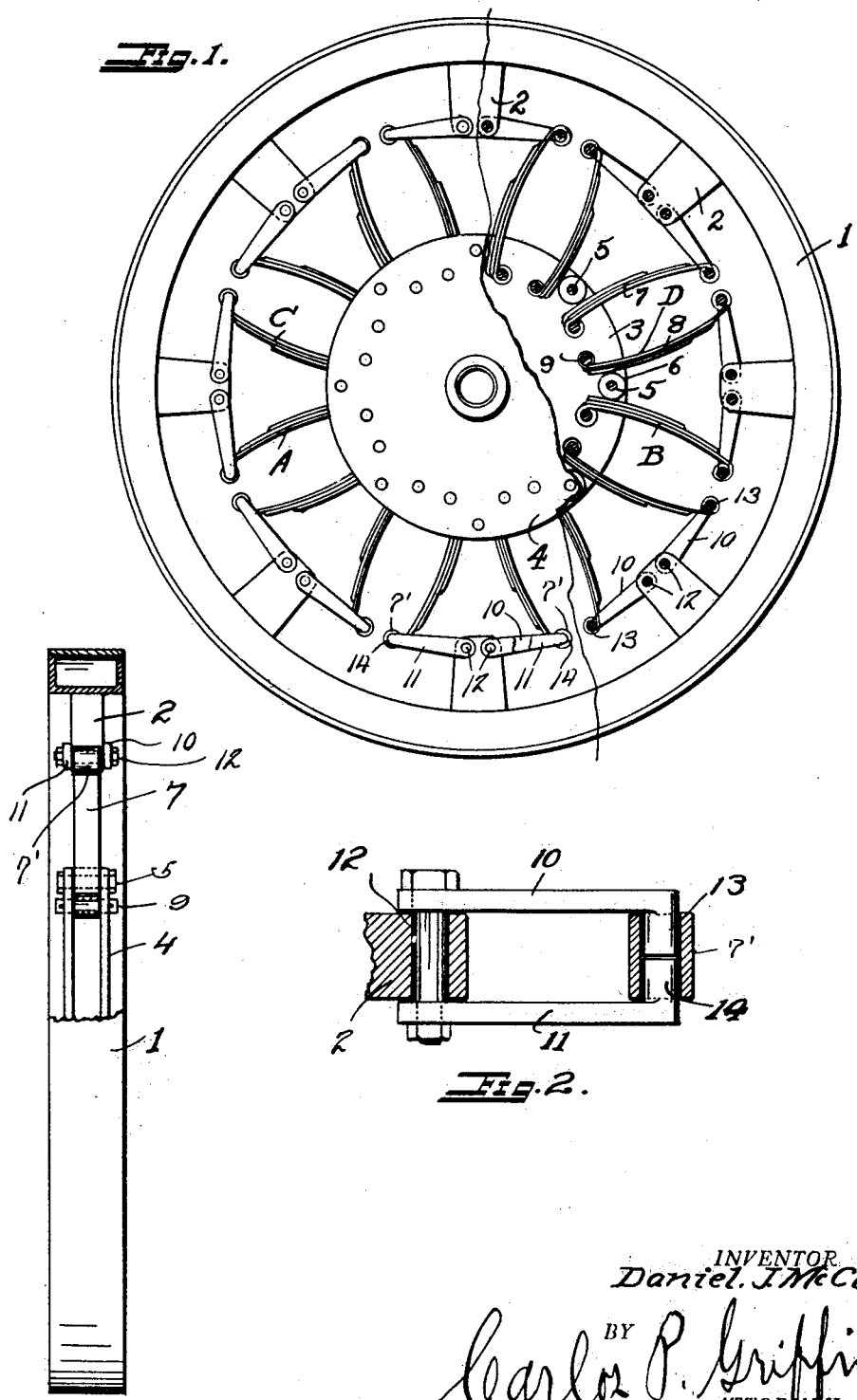
Figure 1 is a side elevation of the wheel.
Fig. 2 is a view of one of the links for connecting the springs to the wheel felly.
Fig. 3 is a view of the wheel in edge elevation, a portion being broken away for purposes of illustration.

The numeral 1 indicates the felly, which may be covered with any desired type of tire. This felly is provided with a plurality of inwardly projecting lugs 2, eight being used in the present illustration, although the number is dependent entirely upon the will of the wheel maker.

The central member of the wheel consists of a pair of circular plates 3 and 4, which have an opening at the center to receive any desired type of hub.

The plates 3 and 4 are connected by a series of bolts 5, which bolts are surrounded by bushings 6, which bushings afford the fulcrums for a series of leaf springs 7 and 8. The leaf springs are connected at one end by means of bolts 9 to the plates 3 and 4, and they are so positioned that they will bear upon the bushings 6 whenever moved toward said bushings by the wheel stresses. When moved away from said bushings by wheel movements, there will be no load placed upon said springs.

At the outer end of the springs, the ordinary form of circular spring eyes 7' are formed and they are connected by means of links 10 and 11, and bolts 12, to the lugs 2. The links 10 and 11 are provided with stubs as shown at 13, and 14, for pivotally connecting them to the spring eyes 7'.

In operation the load is in the first instance supported by the felly and is carried to the plates 3 and 4 through the action of the inwardly projecting lugs 2 which are connected to the movable links 10 and 11 and in turn connected to the springs 7 and 8. The action of the springs is such that they operate in double pairs, two springs for example A and B carrying substantially all of the load and being flexed against their adjacent bushings 6. At the same time any downward movement of the hub consisting of associated parts connected with the plates 3 and 4 will not flex the springs C and D for the reason that they are free to move upwardly and carry no load when moved away from the fulcrum upon which they bear.

In the position shown all of the springs below their adjacent fulcrums will bear a proportion of the load while all of the springs above their adjacent fulcrums will bear no part of the load and the same condition will continue during the movement of the wheel in rolling over the ground. All of the springs below their adjacent fulcrums bearing some of the load a large proportion of the time and only being free of the load when in the position of the two top springs and two bottom springs in Fig. 1 in which position any movement of the hub plates downwardly will move the four springs in question slightly away from each other and they will hence not bear any of the load at that moment.

Since the springs can be flexed against their fulcrum in only one direction, there are no alternating stresses set up in said springs which would be likely to cause their breakage.

What I claim is as follows, but various modifications may be made in the construction shown in the drawings and above particularly described form, within the purview of my invention:

1. A spring wheel comprising a felly, inwardly projecting fixed lugs carried thereby, hub members, leaf springs pivotally mounted on said hub members in oppositely placed pairs, fulcrums for the springs so placed as to permit said springs to be flexed in one direction and moved freely in the other direction and links connecting the felly lugs to the springs.

2. A spring wheel consisting of a felly, inwardly projecting fixed lugs carried thereby, a hub, leaf springs pivotally connected to the hub in pairs, fulcrums on which the springs may be flexed in one direction and from which the springs are freely movable in the opposite direction, and oppositely placed links pivotally connecting the lugs with the spring ends.

In testimony whereof I have hereunto set my hand this 12" day of November, A. D. 1919.

DANIEL J. McCLUSKEY.